(12) United States Patent
Maeda et al.

(10) Patent No.: US 9,015,444 B2
(45) Date of Patent: Apr. 21, 2015

(54) ACCESS APPARATUS AND AVAILABLE STORAGE SPACE CALCULATION METHOD

(75) Inventors: Takuji Maeda, Osaka (JP); Tsutomu Mori, Osaka (JP); Masafumi Nosaka, Osaka (JP); Takeshi Umemoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1205 days.

(21) Appl. No.: 12/672,373

(22) PCT Filed: Jun. 5, 2009

(86) PCT No.: PCT/JP2009/002554
§ 371 (c)(1),
(2), (4) Date: Feb. 5, 2010

(87) PCT Pub. No.: WO2009/150810
PCT Pub. Date: Dec. 17, 2009

(65) Prior Publication Data
US 2012/0131301 A1 May 24, 2012

(30) Foreign Application Priority Data
Jun. 9, 2008 (JP) ................... 2008-150424

(51) Int. Cl.
 G06F 12/00 (2006.01)
 G06F 3/06 (2006.01)
 G06F 17/30 (2006.01)
(52) U.S. Cl.
 CPC ............ *G06F 3/0644* (2013.01); *G06F 3/0611* (2013.01); *G06F 3/0643* (2013.01); *G06F 3/0679* (2013.01); *G06F 17/30091* (2013.01); *G06F 17/30138* (2013.01)

(58) Field of Classification Search
 USPC .......................................................... 711/171
 See application file for complete search history.

(56) References Cited

U.S. PATENT DOCUMENTS 7,447,864 B2 11/2008 Tachibana
2006/0126469 A1 6/2006 Urushibara et al.
(Continued)

FOREIGN PATENT DOCUMENTS

JP 2007-214786 A 8/2007
WO 2008/016081 2/2008
WO WO 2008/072590 A 6/2008

OTHER PUBLICATIONS

International Search Report corresponding to PCT/JP2009/002554 dated Aug. 18, 2009.

*Primary Examiner* — Jared Rutz
*Assistant Examiner* — Hamdy S Ahmed
(74) *Attorney, Agent, or Firm* — Renner, Otto, Boisselle & Sklar, LLP.

(57) ABSTRACT

A method used in an access module that uses a file system to manage a nonvolatile memory of an information recording module enables an available storage space to be calculated in a short time before file data is recorded, and shortens the time required from initialization of the file system to recording. An access module (1) manages information about area management of the file system configured in an information recording module in units of fixed-length blocks. A divisional available storage space calculation unit (103) performs an available storage space calculation process in units of the fixed-length blocks, and completes preparations for recording when detecting a minimum required storage space for recording file data and enables recording of the file data. This shortens the time required from initialization of the file system to recording.

1 Claim, 15 Drawing Sheets

(56) References Cited

U.S. PATENT DOCUMENTS

2007/0182846 A1 8/2007 Uchida et al.
2009/0055576 A1* 2/2009 Nakanishi et al. ............ 711/103
2010/0005227 A1 1/2010 Nakanishi et al.
2011/0022807 A1 1/2011 Maeda et al.

* cited by examiner

| Assigned cluster number | | | | | | | |
|---|---|---|---|---|---|---|---|
| 2~7 | 0xF8FF <br>{ Signature | 0xFFFF } | 0x0003 <br>(3) | 0x0004 <br>(4) | 0x0005 <br>(5) | 0xFFFF | 0x0000 |
| 8~15 | 0x0000 | 0x0000 | 0x000B <br>(11) | 0x000C <br>(12) | 0xFFFF | 0x0000 | 0x0000 |
| 16~23 | 0x0000 | 0x0000 | 0x0000 | 0x0000 | 0x0000 | 0x0000 | 0x0000 |
| 24~31 | 0x0019 <br>(25) | 0x001A <br>(26) | 0x001B <br>(27) | 0x001C <br>(28) | 0x001D <br>(29) | 0x001E <br>(30) | 0xFFFF |

FAT ~ 205, 206

FIG. 6

Available storage space information ~301

| FAT block No. | Status | Available storage space (Number of clusters) |
|---|---|---|
| 0 | 1(Calculated) | 3700 |
| 1 | 1(Calculated) | 6788 |
| 2 | 0 (Yet to be calculated) | 0 |
| 3 | 0 (Yet to be calculated) | 0 |
| 4 | 0 (Yet to be calculated) | 0 |
| 5 | 0 (Yet to be calculated) | 0 |
| 6 | 0 (Yet to be calculated) | 0 |
| 7 | 0 (Yet to be calculated) | 0 |

Available storage space information ~301

| FAT block No. | Status | Available storage space (Number of clusters) |
|---|---|---|
| 0 | 0 (Yet to be calculated) | 0 |
| 1 | 0 (Yet to be calculated) | 0 |
| 2 | 0 (Yet to be calculated) | 0 |
| 3 | 0 (Yet to be calculated) | 0 |
| 4 | 0 (Yet to be calculated) | 0 |
| 5 | 0 (Yet to be calculated) | 0 |
| 6 | 0 (Yet to be calculated) | 0 |
| 7 | 0 (Yet to be calculated) | 0 |

```
                    ┌─────────┐
                    │  Start  │
                    └────┬────┘
                         │                    S1101
      ┌──────────────────▼──────────────────────┐
      │ Generate file system information based  │
      │ on file system management information   │
      │ stored in RAM                           │
      └──────────────────┬──────────────────────┘
                         │                    S1102
      ┌──────────────────▼──────────────────────┐
      │ Transmit file system information to     │
      │ application control unit                │
      └──────────────────┬──────────────────────┘
                         │
                    ┌────▼────┐
                    │   End   │
                    └─────────┘
```

FIG. 11

File system information ~302

| FS type | 1(FAT16) |
|---|---|
| Sector size | 512 bytes |
| Cluster size | 32 sectors |
| Total storage space | 65000 clusters |
| FAT block number | 8 |

FIG. 12

Available storage space information ~301

| FAT block No. | Status | Available storage space (Number of clusters) |
|---|---|---|
| 0 | 1(Calculated) | 3700 |
| 1 | 0 (Yet to be calculated) | 0 |
| 2 | 0 (Yet to be calculated) | 0 |
| 3 | 0 (Yet to be calculated) | 0 |
| 4 | 0 (Yet to be calculated) | 0 |
| 5 | 0 (Yet to be calculated) | 0 |
| 6 | 0 (Yet to be calculated) | 0 |
| 7 | 0 (Yet to be calculated) | 0 |

FIG. 14

Available storage space information ~301

| FAT block No. | Status | Available storage space (Number of clusters) |
|---|---|---|
| 0 | 1(Calculated) | 3700 |
| 1 | 1(Calculated) | 6788 |
| 2 | 1(Calculated) | 8024 |
| 3 | 1(Calculated) | 8192 |
| 4 | 1(Calculated) | 8192 |
| 5 | 1(Calculated) | 8192 |
| 6 | 1(Calculated) | 8192 |
| 7 | 1(Calculated) | 7658 |

FIG. 16

ACCESS APPARATUS AND AVAILABLE STORAGE SPACE CALCULATION METHOD

TECHNICAL FIELD

The present invention relates to an access apparatus (access device) (access module) that stores data into a nonvolatile memory and manages the data in files, and to an available storage space calculation method (a method for calculating remaining capacity).

BACKGROUND ART

A variety of media are used to store digital data such as music content and video data. Examples include magnetic disks, optical discs, and magneto-optical disks. Among such recording media, memory cards that use semiconductor memories including flash ROMs as their recording elements are compact, and thus have become rapidly widespread mainly in compact portable devices, such as movie or digital still cameras and mobile telephone terminals. In particular, semiconductor memories, which have conventionally been used as removable media like memory cards, have recently found application as built-in memories. For example, semiconductor memories, such as flash ROMs, are built in devices and used in place of hard disks.

A memory card and a built-in memory mainly use a semiconductor device called a NAND-type flash memory, which is a recording element on which recorded data can be erased and new data can be recorded. Like a conventional hard disk, the NAND-type flash memory can be used to form an information recording apparatus that is rewritable a plurality of number of times.

A conventional way to manage data stored in a memory card or a built-in memory uses a file system. Data managed using a file system can be shared as files between a plurality of devices that can interpret the same file system. Such file system management enables a user to easily refer to or copy his or her stored data on a plurality of devices.

A file system that has conventionally achieved most widespread use is a file allocation table (FAT) file system. The FAT file system manages areas in a unified manner using a file allocation table (FAT). With its simple structure and easy implementation, the FAT file system is used in many recording media, such as flexible disks, hard disks of personal computers, and memory cards.

FIG. 2 shows the structure of the FAT file system. The FAT file system can be of one of a plurality of types: FAT12, FAT16, and FAT32, which differ from one another in the bit width of the management unit used in their file allocation table. The FAT file system of any of these types uses substantially the same method for managing areas using the file allocation table. In this example, the FAT16 file system will be described.

As shown in FIG. 2, at the beginning of the logical address space is a file system management information area 201, which stores management information for the file system, such as information indicating the unit of area allocation and the size of areas that are managed by the file system.

The file system management information area 201 stores a plurality of sets of management information: a master boot record (MBR) partition table 203, a partition boot sector 204, FATs (205 and 206), and a root directory entry 207, each of which stores information required to manage a user data area 202.

The MBR partition table 203 stores information used to manage areas of the logical address space managed by the file system by dividing the logical address space into a plurality of areas called partitions.

The partition boot sector 204 stores information about management within each partition, such as information about the unit of area management within the partition. The FATs (205 and 206) each store information about the storage position of file data. The FAT file system usually has two FATs (205 and 206) each storing the same information. Even if one FAT (205 or 206) is corrupted, the duplicated FATs of the FAT file system enables access to files by using the other FAT (205 or 206).

The root directory entry 207 stores information about files and directories (directory entries) that are immediately below the root directory.

The FAT file system further includes the user data area 202, which is preceded by the file system management information area 201. The user data area 202 stores main data stored in files and the like. The user data area 202 is managed in units of divisional areas called clusters, which each have a size of 512 bytes to tens of kilobytes. Each cluster stores data stored in files. A file storing a large amount of data uses a plurality of clusters to store the data. The FATs (205 and 206) store link information that is used to manage links between such clusters. Also, a part of the user data area 202 is used to store information about files and sub-directories (directory entries) immediately below the root directory.

FIG. 3 shows the structure of a directory entry of the FAT16 file system.

A directory entry 208, which has 32 bytes, is allocated to each file or each directory, and stores information associated with the file or the directory. More specifically, information representing the 32-byte directory entry 208 is newly created every time when a file or a directory is added, and is stored into the area of the root directory entry 207 or into the user data area 202.

The first eight-byte part of the directory entry 208 stores a file name or a directory name. The following three-byte part stores an extension. The following one-byte part stores attribute information, such as a flag indicating a type either being a file or a directory, and a flag indicating whether the file or the directory is read-only. The following parts may further store information about the last update time and date of the file or the directory, a first cluster number indicating the position of a first cluster among a plurality of clusters storing the file data or the directory data, and a file size indicating the number of bytes of the file.

As described above, the directory entry 208 only stores information indicating the position of the first single cluster storing the file data or the directory data. The positions of data stored in the second and subsequent clusters are managed by the FATs (205 and 206) when the file data or the directory data is larger than the size of one cluster.

FIG. 4 shows the structure of the FAT (205, 206) used in the FAT16 file system.

In the FAT16 file system, the FAT (205, 206) manages 2-byte (16-bit) information as a single FAT entry. A single FAT entry indicates the status of its corresponding single cluster. More specifically, when the user data area 202 includes M clusters, the FAT includes M FAT entries. In this case, the FAT (205, 206) has a size of about 2*M bytes. The first two FAT entries of the FAT store, as a signature, fixed values (0xF8FF, 0xFFFF) indicating the beginning of the FAT. The fourth and fifth bytes of the FAT (205, 206) store an FAT entry corresponding to the first cluster included in the user data area 202. When the four-byte signature stored at the beginning of the FAT is assumed to be the 0-th and 1$^{st}$ FAT entries, the fourth and fifth bytes are the two bytes storing the second FAT entry. As a result, a cluster number of 2 is assigned to the first cluster included in the user data area 202. No clusters with cluster numbers of 0 and 1 exist.

Each FAT entry further indicates the status of the corresponding cluster (occupied, unoccupied, or defective) and a cluster number of a linked cluster. In FIG. 4, for example, an FAT entry with an assigned cluster number of 2 is set as 0x0003 ("3" when expressed as a decimal number), indicating that data subsequent to the data stored in the cluster with the cluster number of 2 is stored in a cluster with a cluster number of 3. In the same manner, an FAT entry with an assigned cluster number of 3 is set as 0x0004 ("4" when expressed as a decimal number), indicating that data subsequent to the data stored in the cluster with the cluster number of 3 is stored in a cluster with a cluster number of 4. An FAT entry with an assigned cluster number of 6 is set as 0xFFFF, indicating that no cluster is linked to this cluster, and this cluster is the end of the link. In the example shown in FIG. 4, the file data is stored over a plurality of clusters in the order of the cluster numbers of 2, 3, 4, 5, and 6. Also, an FAT entry with an assigned cluster number of 7 is set as 0x0000, indicating that the corresponding cluster is not used and is in an unoccupied status. An FAT entry with an assigned cluster number of (M+1) is set as 0xFFF7, indicating that the corresponding cluster is in a defective status, or that the corresponding cluster is for example physically broken and data cannot be recorded into this cluster.

To sum up, the three FAT entry values 0x0000, 0xFFFF, and 0xFFF7 have different special meanings. The FAT entry values from 0x0002 to 0xFFF6 are used as cluster numbers of linked clusters. The other values, that is, the values 0x0001 and 0xFFF8 to 0xFFFE, are reserved and are not used normally.

As described above, the FAT (205, 206) not only manages information about links between areas storing the file data but also manages the use status of each cluster. The available storage space in areas managed using the file system can thus be calculated by referring to the FAT (205, 206) and counting the number of unoccupied clusters. The available storage space calculation process will now be described with reference to FIG. 5.

Available Storage Space Calculation Process

S501:
The access module initializes a variable (FREE_SPACE) indicating the available storage space to zero.

S502:
The access module sets, as a current reference position, the position of an FAT entry with the cluster number of 2 included in the FAT (205, 206), which is read into a RAM of the access module. The present example assumes that the FAT (205, 206) is read in advance from an information recording module into the RAM of the access module.

S503:
The access module determines whether the current reference position setting has reached the end of the FAT to complete the searching for an available storage space throughout the entire FAT. When the searching has been completed, a current value of the variable FREE SPACE is transmitted, as an available storage space, to an application control unit of the access module. The access module then terminates the processing. When the searching has yet to be completed, the access module advances to the processing in step S504.

S504:
The access module determines whether the FAT entry at the current reference position corresponds to an unoccupied cluster.

More specifically, the access module determines that the FAT entry corresponds to an unoccupied cluster when the FAT entry value is 0X0000, and determines that the FAT entry does not correspond to an unoccupied cluster in any other cases.

When determining that the FAT entry corresponds to an unoccupied cluster, the access module advances to the processing in step S505. When determining that the FAT entry does not correspond to an unoccupied cluster, the access module advances to the processing in step S506.

S505:
The access module, which has detected an unoccupied cluster, adds 1 to the value of the variable FREE_SPACE (increments the value by +1).

S506:
The access module advances the current reference position by one FAT entry, and returns to the processing in step S503.

When, for example, the FAT (205, 206) has the structure shown in FIG. 6, the FAT includes 16 unoccupied clusters in total between the FAT entry to which the cluster number of 2 is assigned and the FAT entry to which the cluster number of 31 is assigned. The total number of unoccupied clusters, which is 16 in this case, is transmitted to the application control unit of the access module as the available storage space.

In the available storage space calculation process, the number of unoccupied clusters in the FAT needs to be counted using the values of all FAT entries included in the FAT. The number of FAT entries increases as the total storage space managed using the file system increases. As the number of FAT entries increases, the time required by the available storage space calculation process would increase accordingly.

To solve the above problem, one conventional method uses information about the available storage space prestored in the file system management information area, such as the partition boot sector 204 (see, for example, Patent Citation 1). With this method, the information about the available storage space can be read from the file system management information area 201 to eliminate the available storage space calculation process, which would otherwise be required to be performed by referring to the FAT (205, 206). This method may shorten the time required by the initialization process of the file system including the available storage space calculation process.

Patent Citation 1: Japanese Unexamined Patent Publication No. 2007-214786

DISCLOSURE OF INVENTION

Technical Problem

However, the above conventional method has the problems described below.

The above method requires the information about the available storage space stored in the file system management information area 201 to be updated by overwriting every time when the available storage space changes, such as when file data is recorded or when a file is deleted. In particular, when the above method is applied to a removable medium, all access apparatuses that use the removable medium need to be able to update the information about the available storage space. When any of the apparatuses fails to update the information, the apparatus may cause its information about the available storage space stored in the file system management information area 201 to disagree with information about the available storage space stored in the FAT (205, 206).

Such information disagreement also occurs in a built-in memory of a device to which the above method is applied when, for example, the device is powered off unintentionally.

To solve the above problems, it is an object of the present invention to provide an access module that calculates an available storage space in a short time in a file system and shortens the time required from initialization of the file system to recording, and an available storage space calculation method used in such an access module.

Technical Solution

A first aspect of the present invention provides an available storage space calculation method used in an access apparatus that accesses an information recording apparatus including a nonvolatile memory storing file data. The method includes a divisional available storage space calculation process and a file access permission determination process.

In the divisional available storage space calculation process, area management information including a plurality of fixed-length block areas is referred to in units of the plurality of fixed-length block areas, and an available storage space included in an area of the nonvolatile memory that is managed using the plurality of fixed-length block areas is calculated as a divisional available storage space for each of the plurality of fixed-length block areas. The area management information is information about area management of a file system that manages the nonvolatile memory. In the file access permission determination process, a total available storage space is obtained by calculating a sum total of the divisional available storage space that has been calculated for each of the plurality of fixed-length block areas every time when the divisional available storage space is newly calculated in the divisional available storage space calculation process, and the obtained total available storage space is compared with a predetermined required storage space, and a file access process is permitted to be started when it is determined that the obtained total available storage space becomes equal to or greater than the required storage space.

With this available storages space calculation method, the area management information is managed in units of the fixed-length block areas, and the divisional available storage space that is the available storage space included in the area of the nonvolatile memory that is managed using the fixed-length block areas is calculated in the divisional available storage space calculation process. This enables the file access process to be started when the minimum required storages space is detected. As a result, the access apparatus can start recording without being required to wait until the available storage space calculation process is completed for the entire area management information. This shortens the time required from initialization of the file system to recording.

A second aspect of the present invention provides the available storage space calculation method of the first aspect of the present invention in which the divisional available storage space is calculated for each of the plurality of fixed-length block areas in an order sequentially from a first one of the plurality of fixed-length block areas in the divisional available storage space calculation process.

A third aspect of the present invention provides the available storage space calculation method of the first aspect of the present invention in which the divisional available storage space is calculated for a last one of the plurality of fixed-length block areas that is set as a first processing target in the divisional available storage space calculation process.

With this available storage space calculation method, the divisional available storage space calculation process is performed first for the last fixed-length block area that is highly likely to have a large available storage space. This increases the likelihood of obtaining a minimum required storage space in a short time.

The "first processing target" refers to a processing target for which the processing is to be performed first.

A fourth aspect of the present invention provides the available storage space calculation method of the first aspect of the present invention in which available storage space information is stored into a memory included in the access apparatus in the divisional available storage space calculation process. The available storage space information includes information about a status indicating whether an available storage space calculation process has been performed for each of the plurality of fixed-length block areas and information about the divisional available storage space that is the available storage space included in the area of the nonvolatile memory managed using the plurality of fixed-length block areas.

A fifth aspect of the present invention provides the available storage space calculation method of the fourth aspect of the present invention further including an available storage space information updating process for updating the available storage space information accordingly when the divisional available storages space is increased or decreased by file access.

With this available storage space calculation method, the available storage space information is updated accordingly in the available storage space information updating process when the divisional available storage space is increased or decreased by file access. This enables the available storage space information to be constantly the latest.

A sixth aspect of the present invention provides the available storage space calculation method of the first aspect of the present invention in which the file access permission determination process includes the following processes:

(1) temporally storing generated file data into a memory included in the access apparatus after permitting the file access process to be started;

(2) transmitting a request to perform a process of calculating the divisional available storage space for a remaining fixed-length block area for which the divisional available storage space has yet to be calculated in the divisional available storage space calculation process; and (3) recording the file data stored in the memory included in the access apparatus into the nonvolatile memory after the divisional available storage space calculation process is completed for all the plurality of fixed-length block areas.

With this available storage space calculation method, the divisional available storage space calculation process is completed for all the fixed-length block areas through the processes (1), (2), and (3) before file data is actually recorded into the nonvolatile memory. Thus, file data can be recorded into an unoccupied area (for example, an unoccupied cluster) included in, for example, the first fixed-length block area (for example, the first FAT block). In this case, an unoccupied area (for example, an unoccupied cluster) included in the last fixed-length block area (for example, the last FAT block) remains unused until all unoccupied areas (for example, all unoccupied clusters) included in the fixed-length block areas other than the last fixed-length block area (for example, an FAT block other than the last FAT block) are used. This enables a minimum required storage space to be constantly obtained in a short time.

A seventh aspect of the present invention provides an available storage space calculation method used in an access apparatus that accesses an information recording apparatus including a nonvolatile memory storing file data. The method includes a file system information obtaining process, a divisional available storage space calculation process, a total available storage space calculation process, a comparison process, and a file access permission determination process.

In the file system information obtaining process, file system information that is information associated with area management information is obtained. The area management information is information about area management of a file system that manages the nonvolatile memory and includes N fixed-length block areas, where N is a natural number. The N fixed-length block areas consist of a 0-th fixed-length block area, a $1^{st}$ fixed-length block area, and subsequent block areas up to an (N−1)th fixed-length block area. In the divisional available storage space calculation process, an available storage space included in an area of the nonvolatile memory that is managed using a K-th fixed-length block area is calculated as a divisional available storage space C(K) for the K-th fixed-length block area, where K is a natural number and K<N. In the total available storage space calculation process, the divisional available storage space C(K) calculated in the divisional available storage space calculation process is added to a total available storage space SUM to obtain the total available storage space SUM including the divisional available storage space C(K) that is managed using the K-th fixed-length block area. In the comparison process, the total available storage space SUM obtained in the total available storage space calculation process is compared with a predetermined required storage space. In the file access permission determination process, a file access process is permitted to be started based on a comparison result obtained in the comparison process.

The divisional available storage space calculation process, the total available storage space calculation process, the comparison process, and the file access permission determination process are performed repeatedly for each fixed-length block that is set as a processing target in a descending order of a block number of each fixed-length block from the (N−1)th fixed-length block area. When the total available storage space SUM becomes equal to or greater than the required available storage space in the comparison process after an available storage space calculation process is performed for an (N−m)th fixed-length block area that is set as a processing target, where m is a natural number, (1) the file access process is permitted to be started in the file access permission determination process, (2) the divisional available storage space calculation process, the total available storage space calculation process, and a process of temporarily storing generated file data into a memory included in the access apparatus after the file access process is permitted to be started are performed repeatedly for fixed-length block areas from the 0-th fixed-length block area to an (N−m−1)th fixed-length block area each of which is set as a processing target in an ascending order of a block number of each fixed-length block area, and (3) the file data stored in the memory included in the access apparatus is recorded into the nonvolatile memory after the divisional available storage space calculation process is completed for all the fixed-length block areas and the total available storage space is calculated for each of all the fixed-length block areas.

With this available storage space calculation method, the divisional available storage space calculation process is completed for all the fixed-length block areas through the above processes before file data is actually recorded into the nonvolatile memory. Thus, file data can be recorded into an unoccupied area (for example, an unoccupied cluster) included in, for example, the first fixed-length block area (for example, the first FAT block). In this case, an unoccupied area (for example, an unoccupied cluster) included in the last fixed-length block area (for example, the last FAT block) remains unused until all unoccupied areas (for example, all unoccupied clusters) included in the fixed-length block areas other than the last fixed-length block area (for example, an FAT block other than the last FAT block) are used. This enables a minimum required storage space to be constantly obtained in a short time.

Although it is preferable to use the above order with this available storage space calculation method, part of the processes may be performed in an order different from the above order.

An eighth aspect of the present invention provides an available storage space calculation method used in an access apparatus that accesses an information recording apparatus including a nonvolatile memory storing file data. The method includes a file system information obtaining process, a divisional available storage space calculation process, a total available storage space calculation process, a comparison process, and a file access permission determination process.

In the file system information obtaining process, file system information that is information associated with area management information is obtained. The area management information is information about area management of a file system that manages the nonvolatile memory and includes N fixed-length block areas, where N is a natural number. The N fixed-length block areas consist of a 0-th fixed-length block area, a $1^{st}$ fixed-length block area, and subsequent block areas up to an (N−1)th fixed-length block area. In the divisional available storage space calculation process, an available storage space included in an area of the nonvolatile memory that is managed using a K-th fixed-length block area is calculated as a divisional available storage space C(K) for the K-th fixed-length block area, where K is a natural number and K<N. In the total available storage space calculation process, the divisional available storage space C(K) calculated in the divisional available storage space calculation process is added to a total available storage space SUM to obtain the total available storage space SUM including the divisional available storage space C(K) that is managed using the K-th fixed-length block area. In the comparison process, the total available storage space SUM obtained in the total available storage space calculation process is compared with a predetermined required storage space. In the file access permission determination process, a file access process is permitted to be started based on a comparison result obtained in the comparison process.

The divisional available storage space calculation process, the total available storage space calculation process, the comparison process, and the file access permission determination process are performed repeatedly for each fixed-length block that is set as a processing target in a descending order of a block number of each fixed-length block from the (N−1)th fixed-length block area, and when the total available storage space SUM becomes equal to or greater than the required available storage space in the comparison process after an available storage space calculation process is performed for an (N−m)th fixed-length block area that is set as a processing target, where m is a natural number, (1) the file access process is permitted to be started in the file access permission determination process, (2) the divisional available storage space calculation process, the total available storage space calculation process, and a process of temporarily storing generated file data into a memory included in the access apparatus after the file access process is permitted to be started are performed repeatedly for fixed-length block areas from an (N−m−1)th fixed-length block area to the 0-th fixed length block area each of which is set as a processing target in a descending order of a block number of each fixed-length block area, and (3) the file data stored in the memory included in the access apparatus is recorded into the nonvolatile memory after the divisional available storage space calculation process is completed for all the fixed-length block areas and the total available storage space is calculated for each of all the fixed-length block areas.

With this available storage space calculation method, the divisional available storage space calculation process is completed for all the fixed-length block areas through the above processes before file data is actually recorded into the nonvolatile memory. Thus, file data can be recorded into an unoccupied area (for example, an unoccupied cluster) included in, for example, the first fixed-length block area (for example, the first FAT block). In this case, an unoccupied area (for example, an unoccupied cluster) included in the last fixed-length block area (for example, the last FAT block) remains unused until all unoccupied areas (for example, all unoccupied clusters) included in the fixed-length block areas other than the last fixed-length block area (for example, an FAT block other than the last FAT block) are used. This enables a minimum required storage space to be constantly obtained in a short time.

Although it is preferable to use the above order with this available storage space calculation method, part of the processes may be performed in an order different from the above order.

A ninth aspect of the present invention provides an access apparatus that accesses an information recording apparatus including a nonvolatile memory storing file data. The apparatus includes a divisional available storage space calculation unit and an application control unit.

The divisional available storage space calculation unit refers to area management information including a plurality of fixed-length block areas in units of the plurality of fixed-length block areas, and calculates, as a divisional available storage space for each of the plurality of fixed-length block areas, an available storage space included in an area of the nonvolatile memory that is managed using the plurality of fixed-length block areas. The area management information is information about area management of a file system that manages the nonvolatile memory. The application control unit transmits a request to perform a process of calculating the divisional available storage space to the divisional available storage space calculation unit.

The application control unit obtains a total available storage space by calculating a sum total of the divisional available storage space that has been calculated for each of the plurality of fixed-length block areas every time when the divisional available storage space calculation unit newly calculates the divisional available storage space for each fixed-length block area, and compares the obtained total available storage space with a predetermined required storage space, and permits a file access process to be started when determining that the obtained total available storage space becomes equal to or greater than the required storage space.

This access apparatus manages the area management information in units of the fixed-length block areas, and the divisional available storage space calculation unit calculates the divisional available storage space that is the available storage space included in the area of the nonvolatile memory that is managed using the fixed-length block areas. This enables the file access process to be started when the minimum required storages space is detected. As a result, the access apparatus can start recording without being required to wait until the available storage space calculation process is completed for the entire area management information. This shortens the time required from initialization of the file system to recording.

The "access apparatus" may be an access module.

A tenth aspect of the present invention provides the access apparatus of the ninth aspect of the present invention in which the application control unit designates at least one of the plurality of fixed-length block areas as a calculation target when transmitting the request to perform the divisional available storage space calculation process to the divisional available storage space calculation unit. The divisional available storage space calculation unit performs the divisional available storage space calculation process for the designated at least one fixed-length block area.

An eleventh aspect of the present invention provides the access apparatus of the tenth aspect of the present invention in which the application control unit designates at least one of the plurality of fixed-length block areas as a calculation target area in an order sequentially from a first one of the plurality of fixed-length block areas when transmitting the request to perform the divisional available storage space calculation process to the divisional available storage space calculation unit.

A twelfth aspect of the present invention provides the access apparatus of the tenth aspect of the present invention in which the application control unit first designates a last one of the plurality of fixed-length block areas as a calculation target area when transmitting the request to perform the divisional available storage space calculation process to the divisional available storage space calculation unit.

This access apparatus performs the divisional available storage space calculation process first for the last fixed-length block area that is highly likely to have a large available storage space. This increases the likelihood of obtaining a minimum required storage space in a short time.

A thirteenth aspect of the present invention provides the access apparatus of the ninth aspect of the present invention in which the divisional available storage space calculation unit stores available storage space information into a memory included in the access apparatus. The available storage space information includes information about a status indicating whether the available storage space calculation process has been performed for each of the plurality of fixed-length block areas and information about the divisional available storage space that is the available storage space included in the area of the nonvolatile memory managed using the plurality of fixed-length block areas.

A fourteenth aspect of the present invention provides the access apparatus of the thirteenth aspect of the present invention in which the divisional available storage space calculation unit updates information about an increase or decrease in the divisional available storage space when the divisional available storages space is increased or decreased by file access.

In this access apparatus, the divisional available storage space calculation unit updates the available storage space information accordingly when the divisional available storage space is increased or decreased by file access. This enables the available storage space information to be constantly the latest.

A fifteenth aspect of the present invention provides the access apparatus of the ninth aspect of the present invention in which the application control unit temporally stores generated file data into a memory included in the access apparatus after permitting the file access process to be started, and records the file data stored in the memory into the nonvolatile memory after the divisional available storage space calculation process is completed for all the plurality of fixed-length block areas.

This access apparatus completes the divisional available storage space calculation process for all the fixed-length block areas before file data is actually recorded into the nonvolatile memory. Thus, file data can be recorded into an unoccupied area (for example, an unoccupied cluster) included in, for example, the first fixed-length block area (for example, the first FAT block). In this case, an unoccupied area (for example, an unoccupied cluster) included in the last fixed-length block area (for example, the last FAT block) remains unused until all unoccupied areas (for example, all unoccupied clusters) included in the fixed-length block areas other than the last fixed-length block area (for example, an FAT block other than the last FAT block) are used. This enables a minimum required storage space to be constantly obtained in a short time.

A sixteenth aspect of the present invention provides the access apparatus of the ninth aspect of the present invention in which the application control unit designates information about a cluster number of a first cluster for which the divisional available storage space calculation process is to be started in a calculation target area and about a size of the calculation target area when transmitting the request to perform the divisional available storage space calculation process to the divisional available storage space calculation unit, and the divisional available storage space calculation unit performs the divisional available storage space calculation for at least one of the plurality of fixed-length block areas that uses the designated calculation target area as a management target.

A seventeenth aspect of the present invention provides the access apparatus of the sixteenth aspect of the present invention in which the application control unit designates, as the information about the cluster number of the first cluster in the calculation target area and about the size of the calculation target area, information about a cluster number of a first cluster for which the divisional available storage space calculation is to be started in a calculation target area and about the size of the calculation target area in an order sequentially from a first part of the area that is managed by the file system when transmitting the request to perform the divisional available storage space calculation process to the divisional available storage space calculation unit.

An eighteenth aspect of the present invention provides the access apparatus of the sixteenth aspect of the present invention in which the application control unit first sets a last part of the area that is managed by the file system as a processing target of the divisional available storage space calculation process, and designates, as the information about the cluster number of the first cluster in the calculation target area and about the size of the calculation target area, information about a cluster number of a first cluster for which the divisional available storage space calculation process is to be started in the last part of the area managed by the file system and about a size of the last part of the area managed by the file system when transmitting the request to perform the divisional available storage space calculation process to the divisional available storage space calculation unit.

This access apparatus performs the divisional available storage space calculation process first for the last fixed-length block area that is highly likely to have a large available storage space. This increases the likelihood of obtaining a minimum required storage space in a short time.

A nineteenth aspect of the present invention provides the access apparatus of the ninth aspect of the present invention in which the application control unit designates the predetermined required storage space when transmitting the request to perform the divisional available storage space calculation process to the divisional available storage space calculation unit, and the divisional available storage space calculation unit repeatedly performs the available storage space calculation process in units of the plurality of fixed-length block areas until obtaining an available storage space equal to or greater than the designated predetermined required storage space.

A twentieth aspect of the present invention provides the access apparatus of the nineteenth aspect of the present invention in which the divisional available storage space calculation unit performs the divisional available storage space calculation process in an order sequentially from a first one of the plurality of fixed-length block areas when repeatedly performing the available storage space calculation process in units of the plurality of fixed-length block areas until obtaining the available storage space equal to or greater than the designated predetermined required storage space.

A twenty first aspect of the present invention provides the access apparatus of the nineteenth aspect of the present invention in which the divisional available storage space calculation unit first performs the divisional available storage space calculation process for a last block area among the plurality of fixed-length block areas when repeatedly performing the available storage space calculation process in units of the plurality of fixed-length block areas until obtaining the available storage space equal to or greater than the designated predetermined required storage space.

This access apparatus performs the divisional available storage space calculation process first for the last fixed-length block area that is highly likely to have a large available storage space. This increases the likelihood of obtaining a minimum required storage space in a short time.

A twenty second aspect of the present invention provides a program enabling a computer to implement an available storage space calculation method used in an access apparatus that accesses an information recording apparatus including a nonvolatile memory storing file data. The available storage space calculation method includes a divisional available storage space calculation process and a file access permission determination process.

In the divisional available storage space calculation process, area management information including a plurality of fixed-length block areas is referred to in units of the plurality of fixed-length block areas, and an available storage space included in an area of the nonvolatile memory that is managed using the plurality of fixed-length block areas is calculated as a divisional available storage space for each of the plurality of fixed-length block areas. The area management information is information about area management of a file system that manages the nonvolatile memory. In the file access permission determination process, a total available storage space is obtained by calculating a sum total of the divisional available storage space that has been calculated for each of the plurality of fixed-length block areas every time when the divisional available storage space is newly calculated in the divisional available storage space calculation process, and the obtained total available storage space is compared with a predetermined required storage space, and a file access process is permitted to be started when it is determined that the obtained total available storage space becomes equal to or greater than the required storage space.

This program has the same advantageous effects as the available storage space calculation method of the first aspect of the present invention.

Advantageous Effects

The present invention enables an available storage space to be calculated in a short time in a file system, and shortens the time required from initialization of the file system to recording.

BRIEF DESCRIPTION OF DRAWINGS

FIG. 6 shows another example of the FAT.

FIG. 11 is a flowchart showing a file system information obtaining process in the first embodiment.

FIG. 12 shows one example of file system information in the first embodiment.

FIG. 14 shows one example of available storage space information immediately after the available storage space calculation process is performed in the first embodiment.

FIG. 16 shows one example of available storage space information after the available storage space calculation process has been completed for all FAT blocks in the first embodiment.

Figure 1:
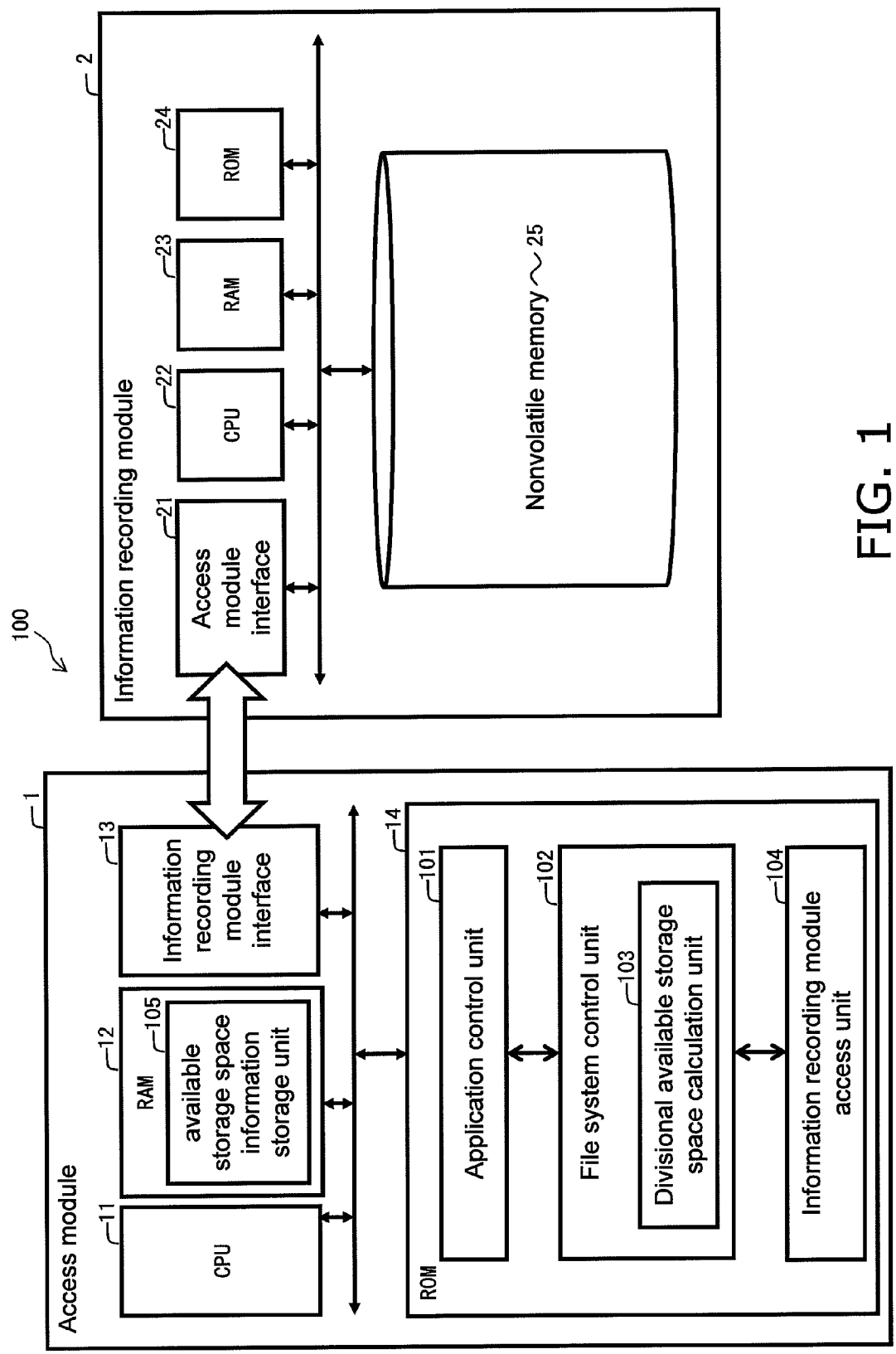
FIG. 1 shows the structure of an access module and an information recording module according to a first embodiment of the present invention.

EXPLANATION OF REFERENCE 100 nonvolatile storage system
1 access module (access apparatus)
2 information recording module (information recording apparatus)
11, 22 CPU
12, 23 RAM
13 information recording module interface
14, 24 ROM
21 access module interface
25 nonvolatile memory
101 application control unit
102 file system control unit
103 divisional available storage space calculation unit
104 information recording module access unit
105 available storage space information storage unit
201 file system management information area
202 user data area
203 MBR partition table
204 partition boot sector
205, 206 FAT
207 root directory entry
208 directory entry
301 available storage space information
302 file system information

BEST MODE FOR CARRYING OUT THE INVENTION

An embodiment of the present invention (in particular an access module and an available storage space calculation method) will now be described with reference to the drawings.

First Embodiment 1.1 Overall Structure

FIG. 1 schematically shows the structure of a nonvolatile storage system 100 according to a first embodiment of the present invention. The nonvolatile storage system 100 includes an access module (access apparatus) 1 and an information recording module (information recording apparatus) 2.

As shown in FIG. 1, the access module 1 includes a CPU 11, a RAM 12, an information recording module interface 13, and a ROM 14.

The ROM 14 stores a program used to control the access module 1. The program is executed by the CPU 11 using the RAM 12 as a temporary memory area.

The information recording module interface 13 functions as a connection unit for connecting the information recording module 2 and the access module 1, and transmits and receives control signals and data between the modules.

The ROM 14 further includes an application control unit 101, a file system control unit 102, and an information recording module access unit 104. The present embodiment assumes that the application control unit 101, the file system control unit 102, and the information recording module access unit 104 are realized using software in the ROM 14. Alternatively, the application control unit 101, the file system control unit 102, and the information recording module access unit 104 may be entirely or partially realized using hardware.

The application control unit 101 executes control over the entire access module 1, such as control associated with data generation and power supply.

The file system control unit 102 executes control associated with management of data as files using a file system.

The information recording module access unit 104 controls transmission and reception of commands and data to and from the information recording module 2. For example, the information recording module access unit 104 receives information about a size and an address together with data from the file system control unit 102, and records data with the designated size at the designated position in a recording area of the information recording module 2.

The file system control unit 102 further includes a divisional available storage space calculation unit 103.

The divisional available storage space calculation unit 103 is a processing unit unique to the present invention, and calculates the available storage space by performing a plurality of divisional processes. The available storage space information storage unit 105 included in the RAM 12 stores information used in the divisional available storage space calculation process performed by the divisional available storage space calculation unit 103.

As shown in FIG. 1, the information recording module 2 includes an access module interface 21, a CPU 22, a RAM 23, a ROM 24, and a nonvolatile memory 25.

The access module interface 21 functions as a connection unit for connecting the information recording module 2 and the access module 1. Like the information recording module interface 13, the access module interface 21 transmits and receives control signals and data between the modules.

The ROM 24 stores a program used to control the information recording module 2. The program is executed by the CPU 22 using the RAM 23 as a temporary storage area.

Figure 2:
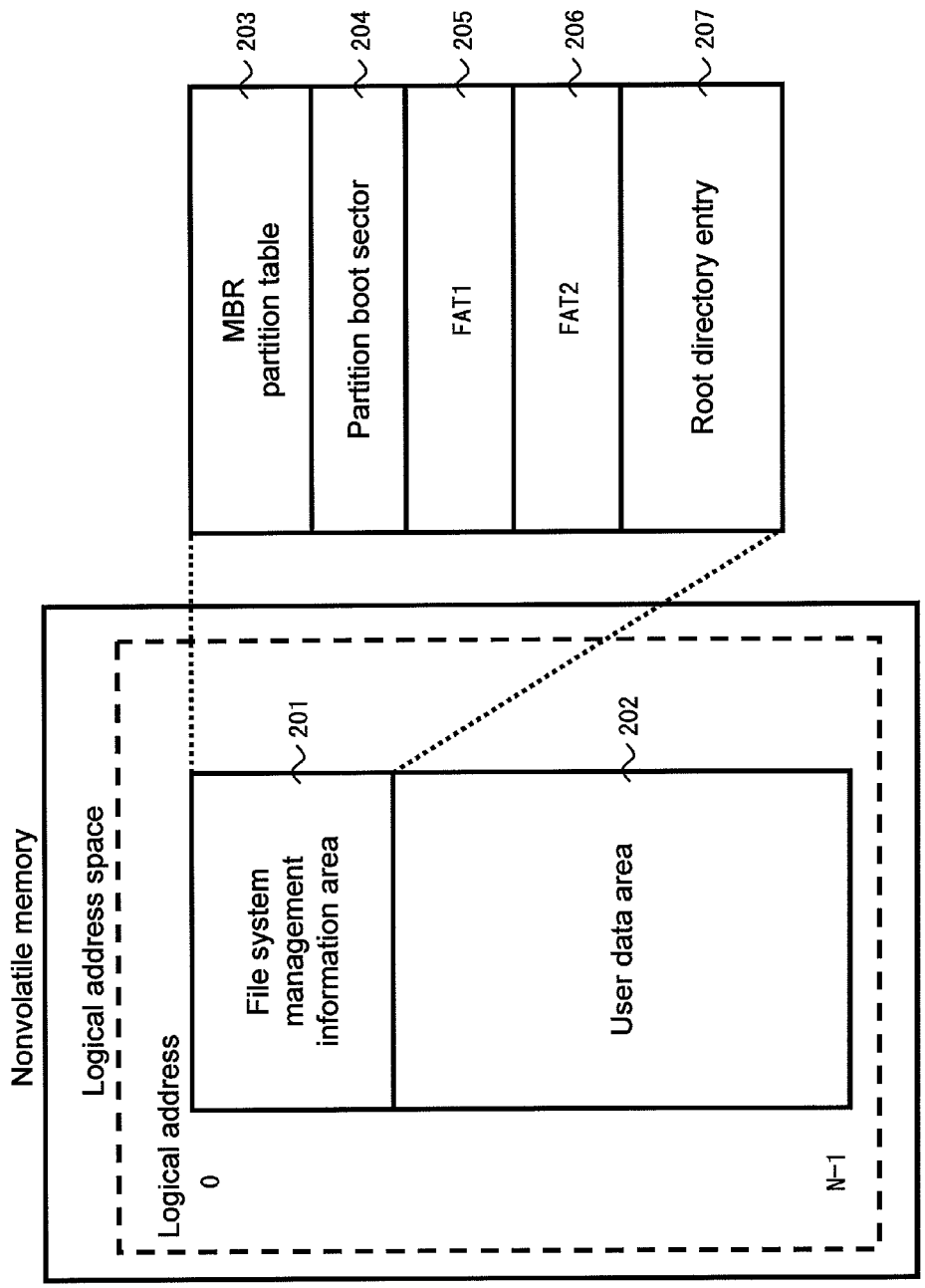
FIG. 2 shows the structure of an FAT file system.
Figure 3:
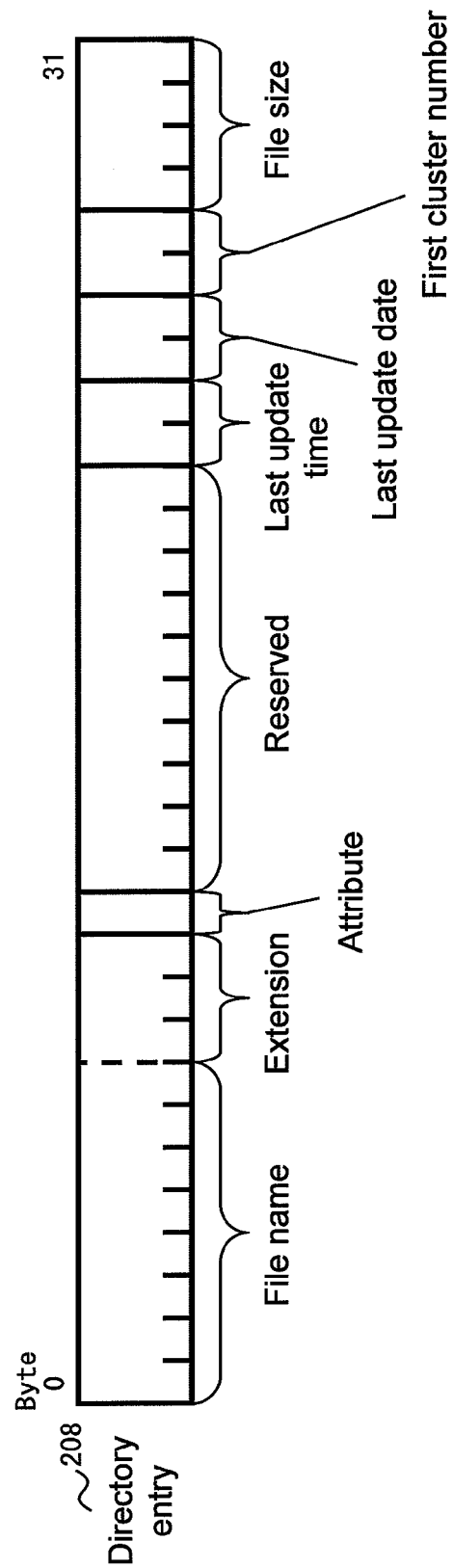
FIG. 3 shows the structure of a directory entry.
Figure 4:
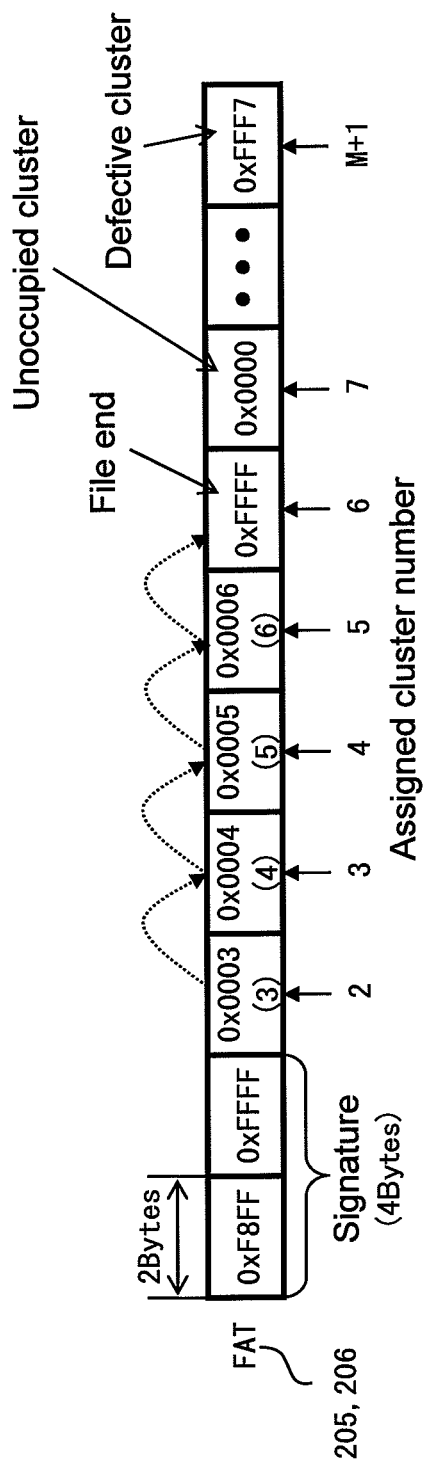
FIG. 4 shows one example of an FAT.
Figure 5:
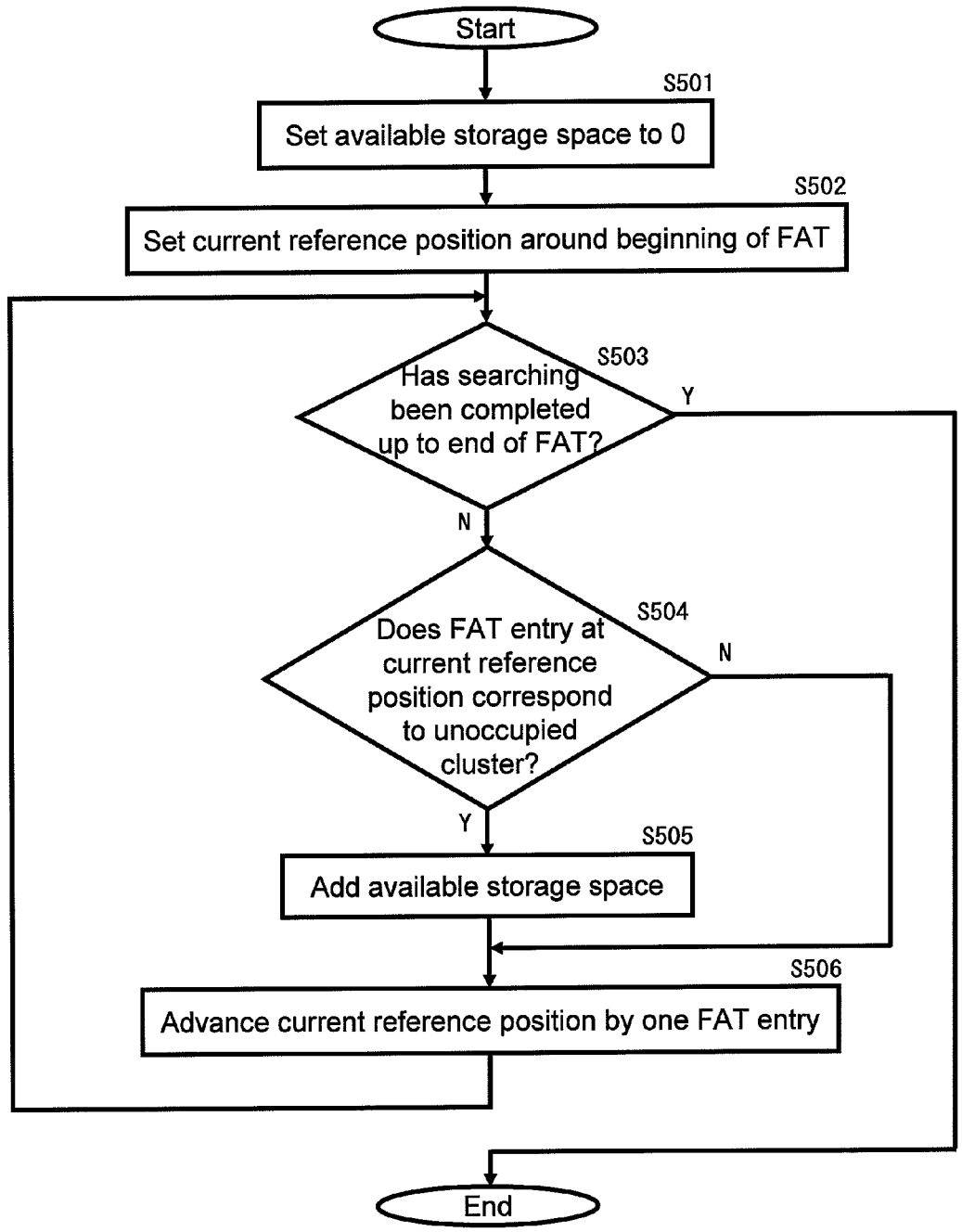
FIG. 5 is a flowchart showing a conventional available storage space calculation process.

The nonvolatile memory 25 stores data transmitted from the access module 1, and its area is managed using the file system. More specifically, the logical address space of the nonvolatile memory 25 consists of data elements of an FAT file system having, for example, the structure shown in FIG. 2. In detail, the recording area of the nonvolatile memory 25 is divided in units of clusters, and is managed using FATs (205 and 206). Information about names or sizes of files and directories are managed using directory entries 208.

The divisional available storage space calculation unit 103 unique to the present invention reads the FAT (205, 206) from the information recording module 2 into the RAM 12 of the access module 1 in the same manner as with the conventional technique, and calculates the available storage space. The divisional available storage space calculation unit 103 differs from the conventional technique in that it performs the available storage space calculation process by dividing the process into a plurality of divisional processes, and enables recording when detecting a minimum required storage space for data recording. This structure of the nonvolatile storage system 100 shortens the processing time required from initialization of the file system to recording as compared with the conventional technique.

1.2 Divisional Available Storage Space Calculation Unit

The divisional available storage space calculation unit 103 of the present embodiment will now be described with reference to FIGS. 7 and 8.

Figures 7, 8:
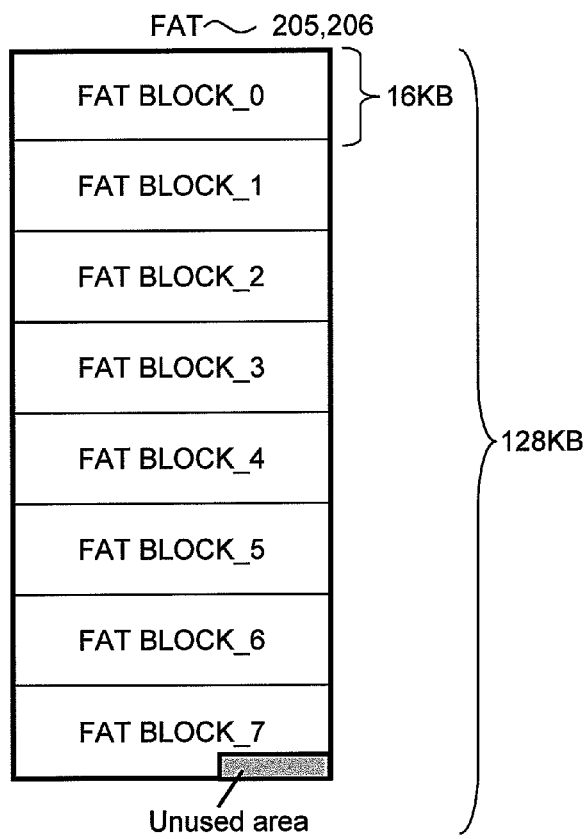
FIG. 7 shows one example of FAT management in the first embodiment.
FIG. 8 shows one example of available storage space information in the first embodiment.

FIG. 7 shows one example of management of the FAT (205, 206) performed by the divisional available storage space calculation unit 103. The figure shows an example in which the user data area 202 that is composed of 65000 clusters each having a size of 16 KB is managed using the FAT (205 and 206). The FAT16 file system uses two bytes to manage each FAT entry. When the FAT16 file system manages 65000 clusters, the FAT (205, 206) has a size little less than 128 KB.

The divisional available storage space calculation unit 103 manages the FAT by dividing it into a plurality of blocks each having a fixed length. This example assumes that the FAT is divided into the fixed-length blocks each having a size of 16 KB. When the FAT (205, 206) having a size of 128 KB is managed by dividing it into a plurality of FAT blocks each having a size of 16 KB, the FAT is divided into eight FAT blocks, which are herein referred to as FAT BLOCK_0 to FAT BLOCK_7. In this case, the FAT (205, 206), which actually has a size a little smaller than 128 KB, includes an area that is not used as an FAT block at the end of FAT BLOCK_7.

FIG. 8 shows one example of available storage space information 301 that is stored by the available storage space calculation unit 103 into the available storage space information storage unit 105.

The available storage space information 301 includes a "status" field and an "available storage space" field for each FAT block.

The "status" field indicates whether the available storage space calculation process has been performed for the corresponding FAT block. The status field stores a value of 1 when the available storage space calculation process has been performed for the FAT, and stores a value of 0 when the available storage space calculation process has yet to be performed for the FAT.

The "available storage space" field indicates the available storage space of the corresponding FAT block, and specifically stores the number of clusters constituting the available storage space. The sum total of the available storage space values of all FAT blocks is used as the available storage space of the entire user data area 202.

As described above, the divisional available storage space calculation unit 103 of the present embodiment calculates and manages the available storage space in units of FAT blocks.

1.3 Mounting Process

A mounting process performed by the file system control unit 102 of the present embodiment will now be described with reference to FIG. 9. The mounting process is the first process performed when the file system is used. In other words, the mounting process is the initialization process of the file system.

S901:

The file system control unit 102 reads file system management information from the file system management information area 201, and determines whether the structure of the file system management information is valid.

S902:

When determining that the structure is valid to enable the mounting process in step S901, the file system control unit 102 advances to the processing in step S904. When detecting an abnormality in the structure to disable the mounting process, the file system control unit 102 advances to the processing in step S903. For example, when detecting the structure that disables the file system to function normally, such as when the sector size is set at 0, the file system control unit 102 determines that the structure is abnormal.

S903:

When determining that the mounting process is not to be enabled in step S902, the file system control unit 102 transmits, to the application control unit 101, error information indicating that the mounting process has failed, and abnormally terminates the processing. After this, access to files will remain disabled unless the system is formatted again or the abnormality in the file system management information is eliminated.

S904:

When the file system control unit 102 determines that the mounting process is to be enabled in step S902, elements of the read file system management information necessary to control the file system, or more specifically information about the sector size, the cluster size, etc. is stored into the RAM 12.

S905:

The file system control unit 102 initializes information stored in the available storage space information storage unit 105 in the RAM 12 used by the divisional available storage space calculation unit 103, and transmits, to the application control unit 101, information indicating that the mounting process has been performed successfully, and terminates the processing. In this initialization process, as shown in FIG. 10, the value of the "status" field for each FAT block number is set to 0, indicating that the available storage space calculation has yet to be performed, and the value of the "available storage space" field is also set to 0. Through the initialization process, the file system is set to a status in which the available storage space for any of all the FAT blocks has yet to be calculated. In this status, the sum total of the available storage space values that have been calculated is zero.

In this manner, the processing up to step S905 has been performed to successfully complete the mounting process in the access module 1. This means that preparations for accessing files by the application control unit 101 have been completed. In this state, however, the file system control unit 102 recognizes the sum total of the available storage space values as zero, and disables processing that newly requires storage space, such as additional writing to files or generating directories. Such processing will be enabled after an available storage space is newly detected in a divisional available storage space calculation process, which will be described later.

1.4 File System Information Obtaining Process

A file system information obtaining process performed by the file system control unit 102 of the present embodiment will now be described with reference to FIG. 11. Through the file system information obtaining process, the application control unit 101 obtains overall information about the file system (hereafter referred to as "file system information 302"), such as the total available storage space of the user data area 202, from the file system control unit 102. The file system information obtaining process is performed before a file is actually accessed after the mounting process is performed.

S1101:

The file system control unit 102 generates the file system information 302 based on the file system management information, which is stored into the RAM 12 when the mounting process is performed. FIG. 12 shows one example of the file system information 302. The file system information 302 shown in FIG. 12 includes an "FS type" field, a "sector size" field, a "cluster size" field, a "total storage space" field, and an "FAT block number" field.

The "FS type" field stores information about the type of the file system. For example, the "FS type" field stores one of a plurality of values that are associated with different types of file system, such as 0 associated with FAT12, 1 with FAT16, and 2 with FAT32.

The "sector size" field stores information indicating the size of a sector, which is a minimum unit for managing the file system.

The "cluster size" field stores information indicating the size of a cluster, which is a unit for managing the user data area 202.

The "total storage space" field stores information indicating the storage space of the entire user data area 202.

The "FAT block number" field stores information indicating the number of blocks when the FAT (205, 206) is managed in units of fixed-length blocks. In the example shown in FIG. 7, the FAT (205, 206) includes eight FAT blocks. In this case, the "FAT block number" field stores a value of 8.

S1102:

The file system control unit 102 transmits the file system information 302 generated in step S1101 to the application control unit 101, and terminates the processing.

In the file system information obtaining process, as described above, the application control unit 101 not only obtains overall information about the file system, such as the total storage space, but also obtains information about the FAT block number. In the present embodiment, the available storage space calculation process is performed in units of the FAT blocks.

1.5 Available Storage Space Calculation Process

The available storage space calculation process performed by the divisional available storage space calculation unit 103 in the present embodiment will now be described with reference to FIG. 13. In the present embodiment, the available storage space calculation process is performed in units of FAT blocks. The available storage space calculation process performed for a single FAT block will now be described.

S1301:

The divisional available storage space calculation unit 103 initializes a variable (FREE_SPACE) indicating the available storage space to zero.

S1302:

The divisional available storage space calculation unit 103 reads a target FAT block, which is an FAT block for which the available storage space is to be calculated, from the information recording module 2 into the RAM 12 included in the access module 1. The target FAT block has been designated by the application control unit 101.

S1303:

The divisional available storage space calculation unit 103 sets, as a current reference position, the beginning position of the FAT block that has been read into the RAM 12 of the access module 1. When the target FAT block is the first block of the FAT (205, 206), the position of an FAT entry with a cluster number of 2 is set as the current reference position. In any other cases, the position of the first FAT entry of the FAT block is set as the current reference position.

S1304:

The divisional available storage space calculation unit 103 determines whether the current reference position setting has reached the end of the FAT block to complete the searching for an available storage space in the entire target FAT block. When the searching has been completed, the divisional available storage space calculation unit 103 advances to the processing in step S1308. When the searching has yet to be completed, the divisional available storage space calculation unit 103 advances to the processing in step S1305.

S1305:

The divisional available storage space calculation unit 103 determines whether the FAT entry at the current reference position corresponds to an unoccupied cluster. More specifically, the divisional available storage space calculation unit 103 determines that the FAT entry corresponds to an unoccupied cluster when the value of the FAT entry is 0x0000, and determines that the FAT entry does not correspond to an unoccupied cluster in any other cases. When determining that the FAT entry at the current reference position corresponds to an unoccupied cluster, the divisional available storage space calculation unit 103 advances to the processing in step S1306. When determining that the FAT entry at the current reference position does not correspond to an unoccupied cluster, the divisional available storage space calculation unit 103 advances to the processing in step S1307.

S1306:

The divisional available storage space calculation unit 103, which has detected an unoccupied cluster, adds 1 to the value of the variable FREE_SPACE (increments the value by +1).

S1307:

The divisional available storage space calculation unit 103 advances the current reference position by one FAT entry, and returns to the processing in step S1304.

S1308:

The divisional available storage space calculation unit 103, which has completed the available storage space determination process for the entire target FAT block, stores the value of the variable FREE_SPACE into the "available storage space" field corresponding to the target FAT block in the available storage space information 301, and sets the value of the "status" field to 1. FIG. 14 shows one example of the available storage space information 301 in which the FAT block with an FAT block number of 0 has been updated. In this example, the FAT block with the FAT block number of 0 has an available storage space of 3700 clusters.

S1309:

The divisional available storage space calculation unit 103 calculates a sum total of the available storage space values stored in the "available storage space" field corresponding to all FAT blocks in the available storage space information 301. The divisional available storage space calculation unit 103 then transmits the sum total as the available storage space to the application control unit 101, and terminates the processing.

In the available storage space calculation process of the present embodiment, as described above, the available storage space calculation for a single FAT block designated by the application control unit 101 is performed, and then a sum total of the available storage space values of all FAT blocks for which the available storage space calculation process has been performed is returned to the application control unit 101. Even when the FAT (205, 206) has a large size, this available storage space calculation process enables the application control unit 101 to perform processing without being required to wait until the available storage space calculation process for the entire FAT (205, 206) is completed.

The available storage space calculation process may not necessarily be performed for a single FAT block at a time, but may be performed for two or more FAT blocks at a time as designated by the application control unit 101. In this case, the processing from steps S1301 to S1308 may be performed repeatedly for a plurality of FAT blocks designated by the application control unit 101 (the processing from steps S1301 to S1308 may be repeated the number of times equal to the number of FAT blocks designated by the application control unit 101), and a sum total of the available storage space values of all the FAT blocks may be calculated only finally by performing the processing in step S1309.

1.6 Sequence of Control between the Application Control Unit 101 and the File System Control Unit 102

One example of the sequence of control between the application control unit 101 and the file system control unit 102 will now be described with reference to FIG. 15.

S1501:

The application control unit 101 first transmits a request to perform the mounting process to the file system control unit 102.

S1502:

The file system control unit 102 then performs the mounting process, which is described with reference to FIG. 9, and then transmits a message indicating that the mounting process has been completed to the application control unit 101.

S1503:

When the mounting process has been performed successfully, the application control unit 101 transmits a request to perform the file system information obtaining process to the file system control unit 102.

S1504:

The file system control unit 102 transmits the file system information 302 to the application control unit 101 after performing the file system information obtaining process, which is described with reference to FIG. 11.

When the file system information obtaining process has been performed successfully, the application control unit 101 transmits a request to perform the available storage space calculation process for FAT BLOCK_0 to the file system control unit 102. An FAT block with an FAT block number K (K is an integer greater than or equal to 0) is referred to as FAT BLOCK_K.

S1506:

The divisional available storage space calculation unit 103 included in the file system control unit 102 performs the available storage space calculation process, which is described with reference to FIG. 13, and then transmits the obtained available storage space to the application control unit 101. In this state, only the available storage space calculation process for FAT BLOCK_0 has been completed. Only the available storage space of FAT BLOCK_0 is thus transmitted to the application control unit 101. The application control unit 101 then determines whether the received available storage space is large enough to store required data. When determining that the available storage space is large enough to store required data, the application control unit 101 determines that preparations for recording have been completed, and starts recording file data as required. The nonvolatile storage system 100 may for example be achieved with a digital still camera including the access module 1. In this case, when the received available storage space is large enough to store one or more still images, the application control unit 101 determines that preparations for capturing still images have been completed. The access module 1 then transmits, to a user, a message indicating that preparations for capturing still images have been completed, and sets the digital still camera in a wait state.

S1507:

Subsequently, the application control unit 101 transmits a request to perform the available storage space calculation process for FAT BLOCK_1 to the file system control unit 102.

S1508:

In the same manner as in step S1506, the divisional available storage space calculation unit 103 included in the file system control unit 102 performs the available storage space calculation process, which is described with reference to FIG. 13, and then transmits the obtained available storage space to the application control unit 101. In this state, the available storage space calculation process has been completed for FAT BLOCK_0 and FAT BLOCK_1. Thus, the sum total of the available storage space values for FAT BLOCK_0 and FAT BLOCK_1 is transmitted to the application control unit 101.

S1509:

The application control unit 101 subsequently transmits a request to perform the available storage space calculation process to the file system control unit 102 and repeats the processing described above until completing the available storage space calculation process for subsequent FAT blocks up to FAT BLOCK_(N−1).

S1510:

The divisional available storage space calculation unit 103 included in the file system control unit 102 performs the available storage space calculation process, which is described with reference to FIG. 13, for a designated FAT block, and then transmits the obtained available storage space to the application control unit 101. In this state, the available storage space calculation process has been completed for all FAT blocks. Thus, the sum total of the available storage space values for all the FAT blocks is transmitted to the application control unit 101.

FIG. 16 shows one example of the available storage space information 301 after the processing up to step S1510 has been completed. As shown in FIG. 16, when the processing up to step S1510 has been completed, the "status" field for all the FAT blocks shows a value of 1, and the "available storage space" field for each of all the FAT block stores the value of its available storage space.

As described above, the divisional available storage space calculation unit 103 included in the access module 1 in the present embodiment manages the FAT (205, 206) in units of fixed-length blocks, and performs the available storage space calculation process by dividing the process in units of fixed-length blocks. The application control unit 101 determines that preparations for recording have been completed when detecting a minimum required storage space, and then starts recording file data. Unlike conventional methods, this structure enables the access module 1 to start recording without being required to wait until the available storage space calculation process for the entire FAT (205, 206) is completed, and thus shortens the time required from initialization of the file system to recording.

Although the present invention has been described based on the above embodiment, the present invention should not be limited to the above embodiment. The above embodiment may be modified without departing from the scope and spirit of the present invention. Numerical values described in the present embodiment are mere examples, and may be other values. For example, although the present embodiment describes the case in which the "status" field in the available storage space information 301 stores one of 0, 1, and 2, this filed may store other values, or may store a character string representing the file system type.

The available storage space information 301 and the file system information 302 described in the present embodiment are mere examples, and other information may be added or the available storage space information 301 and the file system information 302 may be replaced with other information without departing from the scope and spirit of the present invention.

Figure 15:
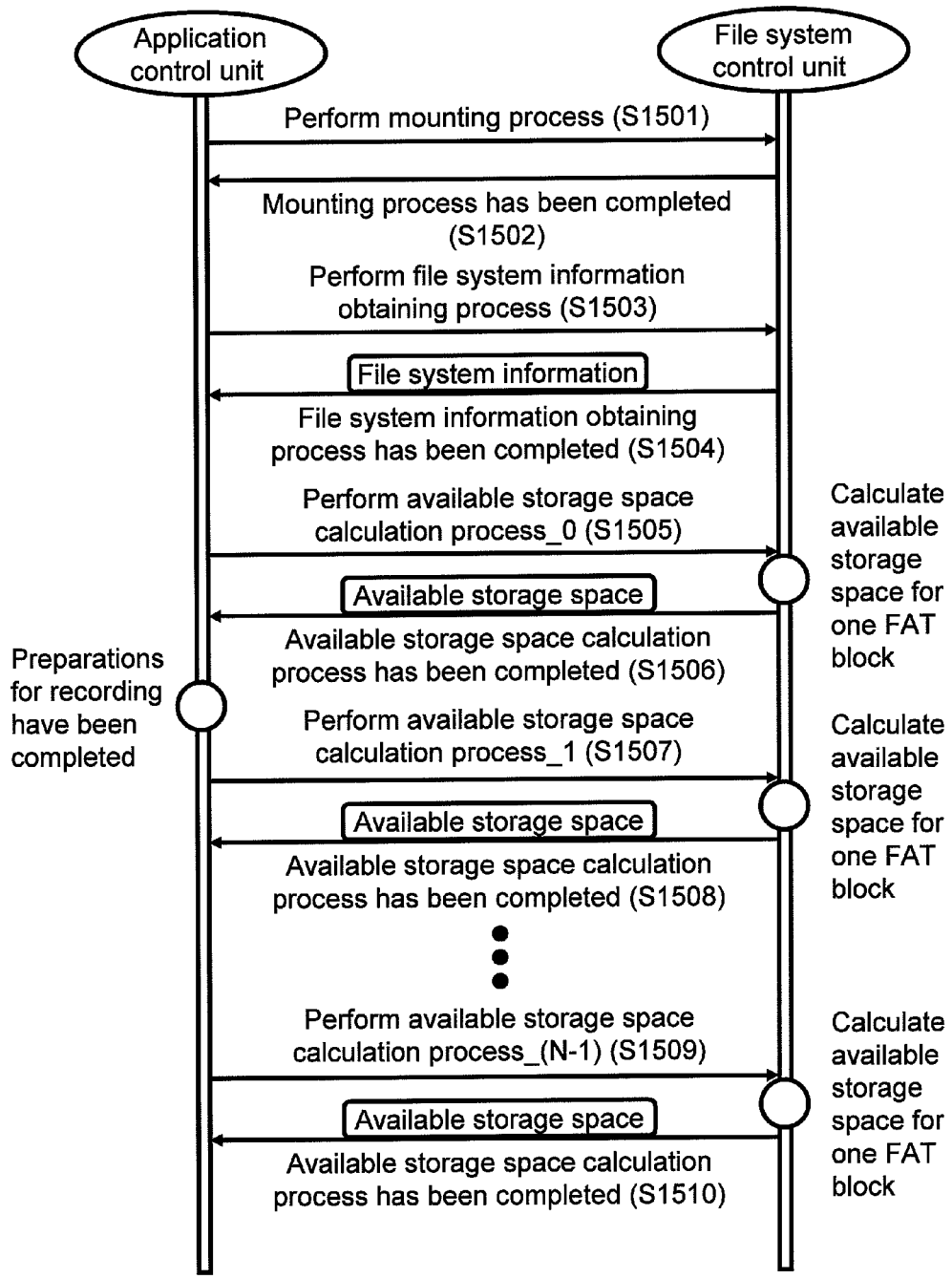
FIG. 15 shows one example of a sequence of control between an application control unit and a file system control unit in the first embodiment.
Figure 17:
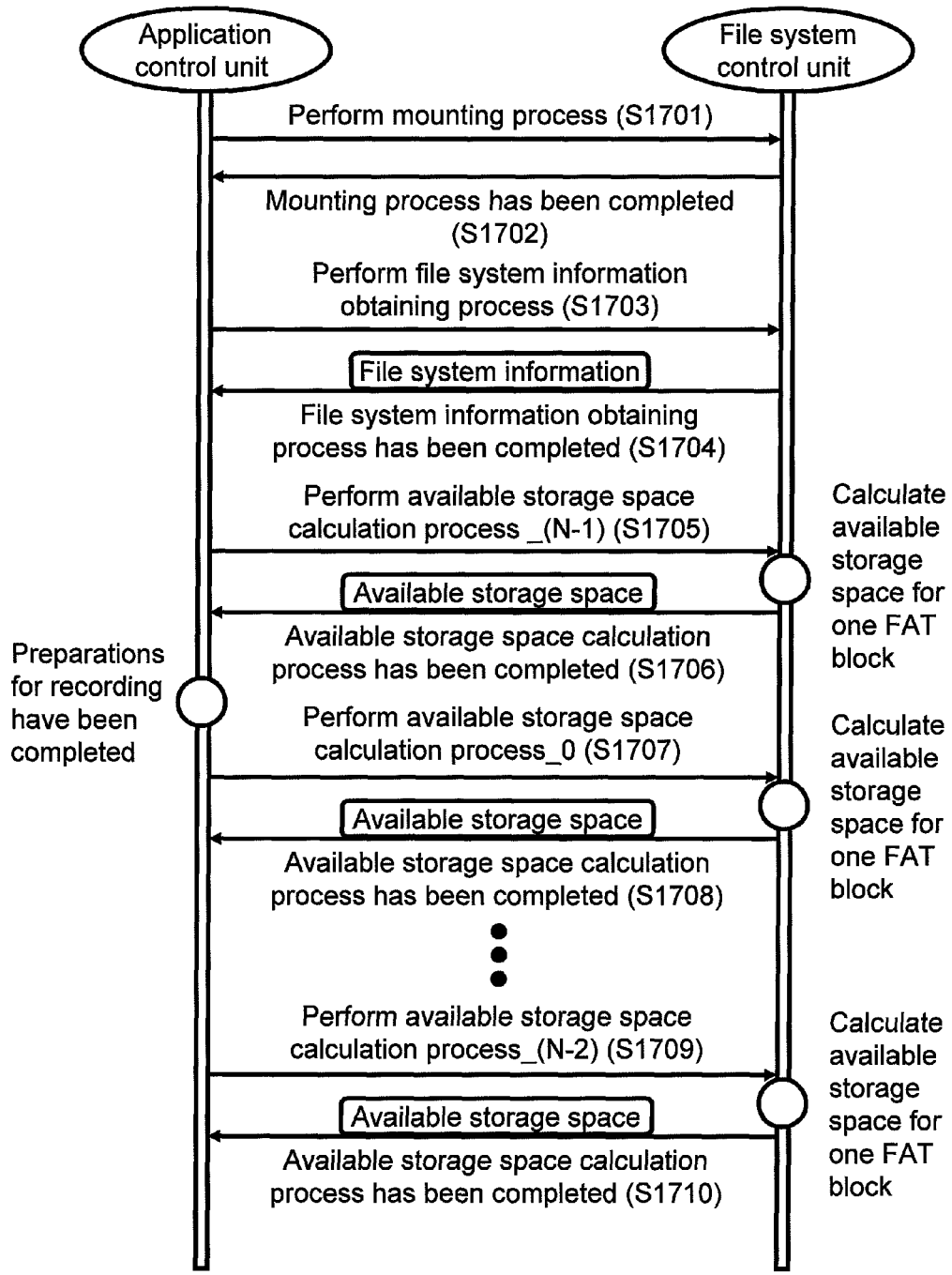
FIG. 17 shows a second example of the sequence of control between the application control unit and the file system control unit in the first embodiment.

Although the available storage space calculation process for FAT blocks is performed in the order sequentially from the first FAT block to the last FAT block in the example shown in FIG. 15, the available storage space calculation process for FAT blocks may be performed in another order. As shown in FIG. 17, for example, the available storage space calculation process may be first performed for the last FAT block and then may be performed for other FAT blocks in the order from the first FAT block to the (last block−1)th FAT block. When file data is recorded, the search for an unoccupied cluster is typically started from the beginning of the FAT (205, 206) and then the file data is recorded into a detected unoccupied cluster. As a result, the FAT (205, 206) would often contain a large number of unoccupied clusters around its end part. Thus, the available storage space calculation process for FAT blocks performed in the order from the last FAT block toward the first FAT block will increase the likelihood of obtaining a minimum required storage space in a short time, and thus enhance the effectiveness of the present invention.

However, when the file data recording is started before the available storage space calculation process is completed for all FAT blocks in the available storage space calculation process that is constantly performed in the order from the last FAT block, the file data may often be recorded into the last FAT block. As a result, the last FAT block may have a smaller available storage space. This would gradually lower the likelihood of obtaining a minimum required storage space in a short time. When the RAM 12 in the access module 1 includes a buffer having a sufficiently large capacity for storing file data, the above problem may be overcome by employing a control sequence shown in FIG. 18.

Figure 18:
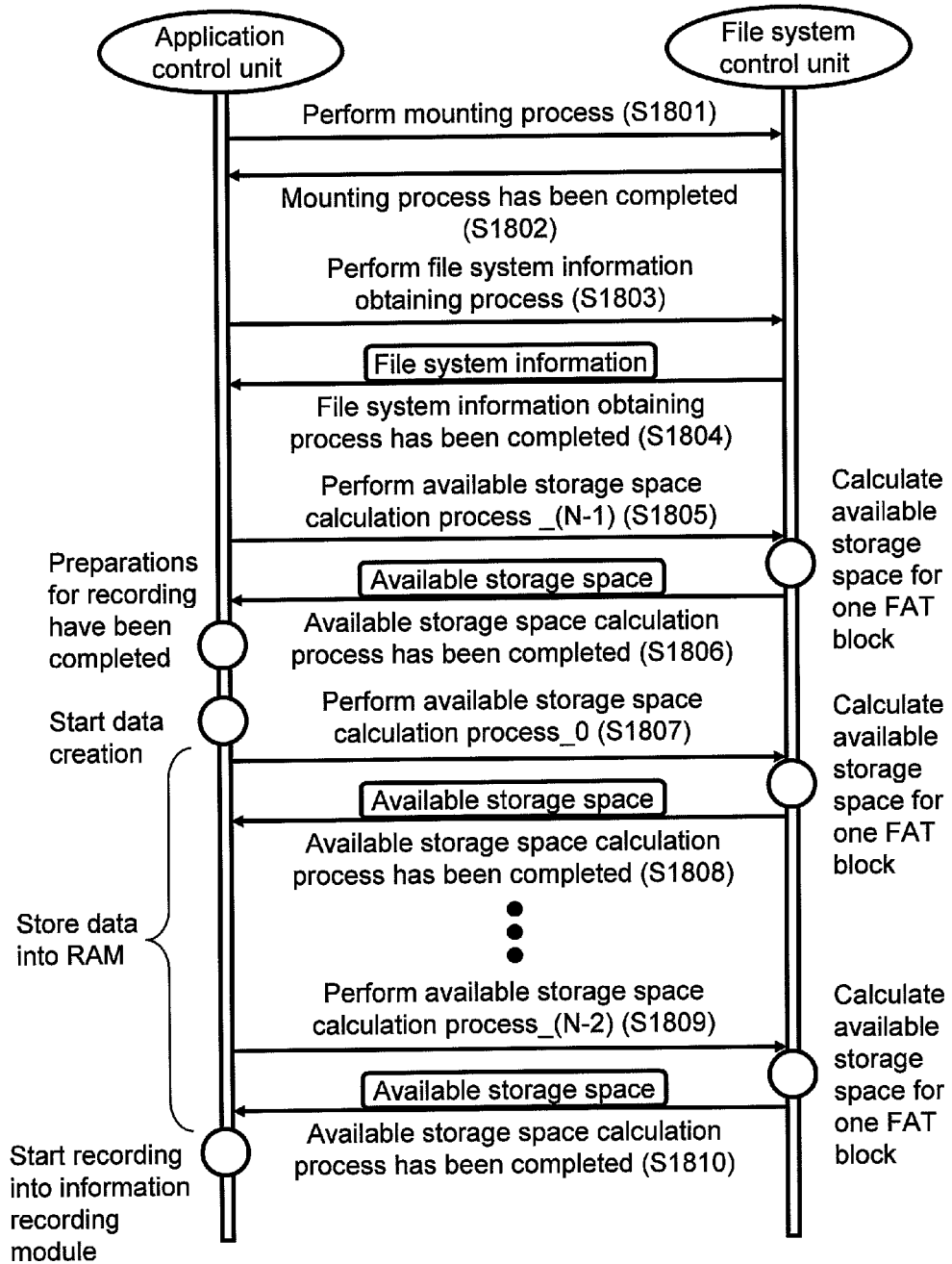
FIG. 18 shows a third example of the sequence of control between the application control unit and the file system control unit in the first embodiment.

The control sequence shown in FIG. 18 differs from the control sequence shown in FIG. 17 in that the file data recording into the information recording module 2 is not started immediately when the application control unit 101 determines that preparations for recording have been completed after the processing in step S1806, but the file data is kept stored in the RAM 12 in the access module 1 until the available storage space calculation is completed for all FAT blocks. The file data recording into the information recording module 2 is actually started after the available storage space calculation for all FAT blocks is completed.

With this control sequence, the available storage space calculation process for all FAT blocks is completed before the file data recording into the information recording module 2 is actually started. This enables the file data to be recorded into an unoccupied cluster included in the first FAT block. An unoccupied cluster included in the last FAT block will be used only after all unoccupied clusters in FAT blocks other than the last FAT block are used. This enables a minimum required storage space to be constantly obtained in a short time.

In FIG. 18, the processing in steps S1807 to S1809 is performed in the order sequentially from FAT BLOCK_0 to FAT BLOCK_(N−2), or in other words, the available storage space calculation for each FAT block is performed in units of FAT blocks in the ascending order of the FAT block number. However, the present invention should not be limited to this method. For example, the processing in steps S1807 to S1809 may be performed in the order sequentially from FAT BLOCK_(N−2) to FAT BLOCK_0, or in other words, the available storage space calculation process for each FAT block may be performed in units of FAT blocks in the descending order of the FAT block number.

In the example shown in FIG. 18, although it is preferable to perform recording into the information recording module 2 and subsequent processing in a manner that file data is recorded into unoccupied clusters in the order of detection from unoccupied clusters in the first FAT block to unoccupied clusters in subsequent blocks (ascending order) as described above, the present invention should not be limited to this method. Alternatively, file data may be recorded into unoccupied clusters in the order from unoccupied clusters in any FAT block other than the last FAT block. For example, recording into the information recording module 2 and subsequent processing may be performed in a manner that file data is recorded into detected unoccupied clusters in the order of detection from unoccupied clusters in the second FAT block (ascending order).

Also, although the present embodiment describes the case in which the application control unit 101 designates the FAT block number of the target FAT block for which the available storage space calculation is to be performed, other information may be used. For example, a pair of cluster numbers, one for a cluster for which the searching is to be started and the other for a cluster for which the searching is to be stopped, may be used to designate a target part of the FAT (205, 206) for which the available storage space calculation process is to be performed. To apply the processing described in the present embodiment to this case, an FAT block including the range of the designated cluster numbers is used as the target for which the available storage space calculation process is to be performed. In the same manner, a pair of FAT block numbers, one for an FAT block for which the searching is to be started and the other for an FAT block for which the searching is to be stopped, may be used to designate a range of FAT blocks for which the available storage space calculation process is to be performed. Alternatively, the size of the available storage space required by the application control unit 101 may be designated. In this case, the file system control unit 102 performs the divisional available storage space calculation process automatically for a selected FAT block until obtaining an available storage space equal to or greater than the available storage space designated by the application control unit 101.

Although the present embodiment describes the case in which the present invention is applied to the FAT file system, the present invention may be applied to other file systems, such as a universal disk format (UDF) file system. For example, the UDF file system uses an allocation bitmap as area management information equivalent to the FAT (205, 206). Each bit of the allocation bitmap indicates the use status of the corresponding single logical block. The entire allocation bitmap is bitmap information including information sets of bit information corresponding in one-to-one to all logical blocks managed by the UDF file system. More specifically, like the FAT (205, 206), the allocation bitmap also has a size that is directly proportional to its total storage space. Thus, the access module including the UDF file system to which the present invention is applied will perform divisional processes for available storage space calculation, and shortens the time required from initialization of the file system to recording.

Figures 9, 10:
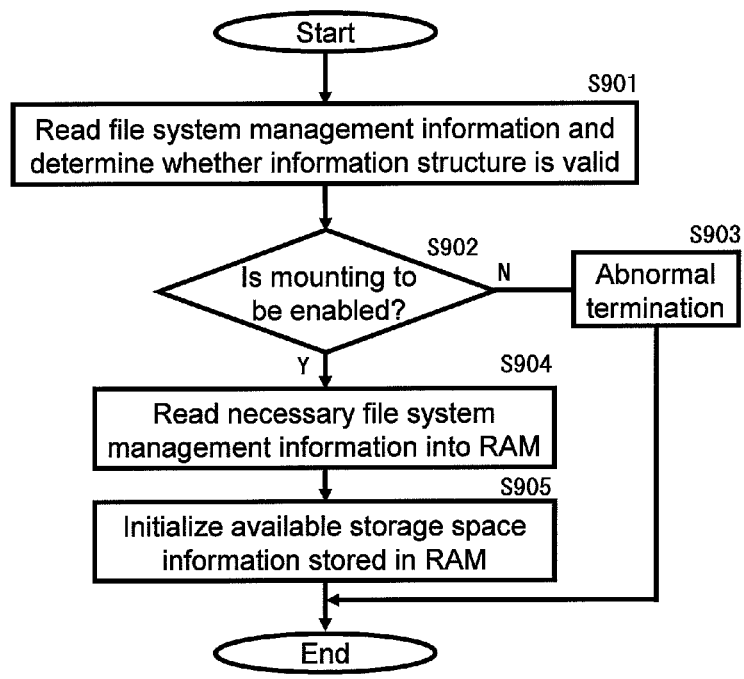
FIG. 9 is a flowchart showing a mounting process in the first embodiment.
FIG. 10 shows one example of available storage space information immediately after the mounting process is performed in the first embodiment.
Figure 13:
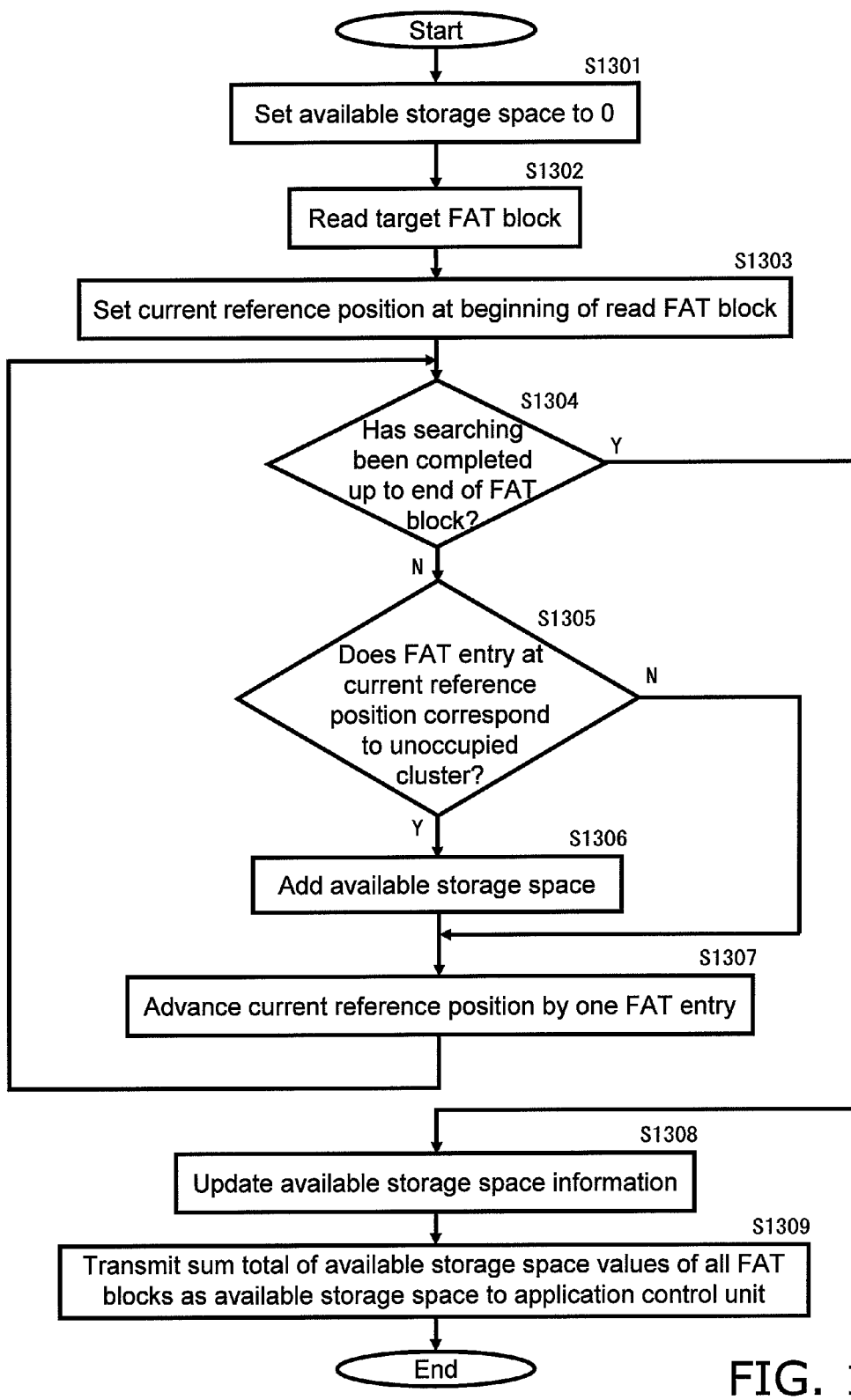
FIG. 13 is a flowchart showing an available storage space calculation process in the first embodiment.

Although the present embodiment describes the case in which the FAT (205, 206) is read into the RAM 12 every time when the available storage space calculation process shown in FIG. 13 is performed, the entire FAT (205, 206) may alternatively be read into the RAM 12 at a timing when, for example, the mounting process, which is described with reference to FIG. 9, is performed. In this case, the nonvolatile storage system 100 eliminates the need for reading the FAT (205, 206) in the available storage space calculation process, and enables the available storage space calculation to be performed in an even shorter time.

The present embodiment describes the case in which the available storage space information 301 is initialized when the mounting process is performed and the information is updated every time when the available storage space calculation process is performed for a target FAT block. However, the information about the available storage space actually changes every time when any processing to change files is performed, such as when file data is recorded or a file is deleted. After such processing, disagreement occurs between the available storage space information 301 and the actual available storage space. In this case, the file system control unit 102 may manage such disagreement, and the application control unit 101 may recalculate the available storage space when referring to the available storage space again. However, when the available storage space increases or decreases frequently, overhead in the available storage space calculation process increases. In this case, when any processing to change files in the file system is performed, such as when file data is recorded or a file is deleted, the access module 1 should update the available storage space information in accordance with an increase or decrease in the newly allocated or released area to enable the available storage space information 301 to constantly indicate the latest available storage space. This will eliminate the need for recalculating the available storage space, and enhance the effectiveness of the present invention. Also, this method only requires the available storage space information 301 in the RAM 12 included in the access module 1 to be updated, and does not require any recording into the information recording module 2, and thus enables the available storage space information 301 to be updated in a shorter time as compared with the conventional method described in Patent Citation 1.

[Other Embodiments]

Each block of the nonvolatile storage system, the access module, and the information recording module described in the above embodiment may be formed using a single chip with a semiconductor device, such as LSI (large-scale integration), or some or all of the blocks of the nonvolatile storage system, the access module, and the information recording module may be formed using a single chip.

Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

The processes described in the above embodiment may be realized using either hardware or software, or may be realized using both software and hardware. When the nonvolatile storage system, the access module, and the information recording module of the above embodiment are implemented by hardware, the nonvolatile storage system, the access module, and the information recording module require timing adjustment for each of their processes. For ease of explanation, timing adjustment associated with various signals required in an actual hardware design is not described in detail in the above embodiment.

The specific structures described in the above embodiment are mere examples of the present invention, and may be changed and modified variously without departing from the scope and spirit of the invention.

Industrial Applicability

The access module 1 of the present invention includes the divisional available storage space calculation unit 103, which calculates the available storage space of the information recording module 2 that is managed using the file system. The divisional available storage space calculation unit 103 manages information about area management of the file system in units of fixed-length blocks, and performs the available storage space calculation process by dividing the process in units of the fixed-length blocks. The access module 1 with this structure completes preparations for recording when detecting a minimum required storage space, and enables recording of file data to be started. This shortens the time required from initialization of the file system to recording. The access module 1 is suitable for use in devices that process digital content, such as music, still images, and moving images, and its applications include a PC application, an audio recorder, a DVD recorder, an HDD recorder, a movie or digital still camera, and a mobile telephone terminal.

The invention claimed is:

1. An access apparatus that accesses an information recording apparatus including a nonvolatile memory storing file data, the apparatus comprising:

an available storage space calculation unit that
refers to area management information including information of a plurality of fixed-length block areas and a size of each fixed-length block area, each fixed length block area being formed by a predetermined number of clusters of a file system that manages the nonvolatile memory, and
calculates an available storage space in each of the plurality of fixed-length block areas based on a file allocation table; and
an application control unit that transmits a request to perform an available storage space calculation process of calculating the available storage space to the available storage space calculation unit,
wherein the application control unit
obtains a total available storage space by calculating a sum total of the available storage spaces that have been calculated for one or more of the plurality of fixed-length block areas for each fixed-length block area,
compares the obtained total available storage space with a predetermined required storage space,
permits a file access process to be started when the obtained total available storage space is equal to or greater than the predetermined required storage space,
designates information about a cluster number of a first cluster for which the available storage space calculation process is to be started in a calculation target area and about a size of the calculation target area when transmitting the request to perform the available storage space calculation process to the available storage space calculation unit,
the available storage space calculation unit performs the available storage space calculation process for at least one of the plurality of fixed-length block areas that uses the designated calculation target area as a management target, and
the application control unit designates, as the information about the cluster number of the first cluster in the calculation target area and about the size of the calculation target area, information about the cluster number of a first cluster for which the storage space calculation is to be started in the calculation target area and about the size of the calculation target area in an order sequentially from a first part of an area that is managed by the file system when transmitting the request to perform the storage space calculation process to the available storage space calculation unit.

* * * * *